United States Patent
Nielsen

(10) Patent No.: US 12,449,201 B2
(45) Date of Patent: Oct. 21, 2025

(54) MULTI-SECTIONAL HEAT EXCHANGER

(71) Applicant: Danfoss A/S, Nordborg (DK)

(72) Inventor: Helge Nielsen, Sydals (DK)

(73) Assignee: DANFOSS A/S, Nordborg (DK)

( * ) Notice: Subject to any disclaimer, the term of this patent is extended or adjusted under 35 U.S.C. 154(b) by 399 days.

(21) Appl. No.: 18/065,138

(22) Filed: Dec. 13, 2022

(65) Prior Publication Data

US 2023/0194178 A1    Jun. 22, 2023

(30) Foreign Application Priority Data

Dec. 16, 2021 (DK) .............................. PA202170624

(51) Int. Cl.
*F28F 27/02* (2006.01)
*F28D 1/03* (2006.01)
(Continued)

(52) U.S. Cl.
CPC .......... *F28D 1/0316* (2013.01); *F28F 9/0209* (2013.01); *F28F 27/02* (2013.01); *F28F 2250/00* (2013.01)

(58) Field of Classification Search
CPC .... F28F 27/02; F28F 3/08; F28F 3/083; F28F 3/086; F28F 3/10; F28D 9/0043; F28D 9/005; F28D 9/0056
See application file for complete search history.

(56) References Cited

U.S. PATENT DOCUMENTS

| | | | |
|---|---|---|---|
| 5,101,640 A * | 4/1992 | Fukushima | ........... F25B 49/027 62/DIG. 17 |
| 5,305,826 A | 4/1994 | Couetoux | |

(Continued)

FOREIGN PATENT DOCUMENTS

DE   10 2005 017974 A1   11/2006

OTHER PUBLICATIONS

Extended European Search Report for European Patent Application No. EP 22214233.3, dated Apr. 18, 2023.

*Primary Examiner* — Frantz F Jules
*Assistant Examiner* — Jason N Thompson
(74) *Attorney, Agent, or Firm* — McCormick, Paulding & Huber PLLC

(57) ABSTRACT

A separating element (10a, 10b) adapted to be positioned in connection to a heat exchanger unit (1, 1a, 1b, 1c) of a sectioned heat exchanger (100) is disclosed. The separating element (10a, 10b) has first openings (11a, 11b) adapted to align with first heat exchanger openings (3a, 3b) forming inlets of a first flow path (A) and a second flow path (B), respectively, through the heat exchanger unit (1, 1a, 1b, 1c). The separating element (10a, 10b) further includes second openings (11c, 11d) adapted to align with second heat exchanger openings (3c, 3d) forming outlets of the first flow path (A) and the second flow path (B), respectively. The first openings (11a, 11b) are formed with first valves (12a, 12b) adapted to close for fluid flow to the first (A) and/or the second (B) flow path through the heat exchanger unit (1, 1a, 1b, 1c), and the second openings (11c, 11d) are formed with second valves (17a, 17b) adapted to close for fluid flow from the first (A) and/or second (B) flow path. The first valves (12a, 12b) are formed with valve stems (13a, 13b), each operated by an actuator (14a, 14b), and the second valves (17a, 17b) are connected to the same valve stems (13a, 13b) as the first valves (12a, 12b), thereby providing coordinated control of the first valves (12a, 12b) and the second valves (17a, 17b).

20 Claims, 7 Drawing Sheets

(51) Int. Cl.
*F28D 9/00* (2006.01)
*F28F 9/00* (2006.01)
*F28F 9/02* (2006.01)
*F28F 9/04* (2006.01)

(56) References Cited

U.S. PATENT DOCUMENTS

| | | | |
|---|---|---|---|
| 5,950,715 A * | 9/1999 | Jonsson | F28D 9/005 |
| | | | 165/103 |
| 8,567,487 B2 | 10/2013 | Christensen et al. | |
| 2010/0122793 A1* | 5/2010 | Wolfe, IV | F28D 1/0535 |
| | | | 165/58 |
| 2013/0192806 A1* | 8/2013 | Noishiki | F04D 29/5826 |
| | | | 165/166 |
| 2013/0306283 A1* | 11/2013 | Bader | F28F 3/08 |
| | | | 165/166 |
| 2014/0262200 A1* | 9/2014 | Sheppard | F28D 1/0333 |
| | | | 137/637.1 |
| 2022/0099389 A1* | 3/2022 | Fernandez | F28D 1/0246 |

* cited by examiner

MULTI-SECTIONAL HEAT EXCHANGER

CROSS-REFERENCE TO RELATED APPLICATION

This application claims foreign priority benefits under 35 U.S.C. § 119 from Danish Patent Application No. PA202170624, filed Dec. 16, 2021, the content of which is hereby incorporated by reference in its entirety.

TECHNICAL FIELD

The present invention relates to a separating element for a sectioned heat exchanger and to a sectioned heat exchanger comprising at least one such separating element.

BACKGROUND

In heating and/or cooling systems the requirement of heating or cooling may change over time, just as the efficiency of the heat exchanger(s) in the heating and/or cooling systems may change due to, e.g., fouling.

For example, when a heat exchanger is over-dimensioned in relation to the required heat transfer, the flows may need to be so low to match a requested temperature that the heat exchanger operates inefficiently with unnecessary loss of energy.

If the heat exchanger scales or fouls, its heat transfer characteristics change, and the flows therefore may need to be raised to meet the requirements, again with an unnecessary loss of energy.

SUMMARY

It is an object of embodiments of the invention to provide a heat exchanger in which a heat transfer capacity can be easily scaled to match varying requirements.

It is a further object of embodiments of the invention to provide a heat exchanger which can be operated in an energy efficient manner under varying operating conditions.

According to a first aspect the invention provides a separating element adapted to be positioned in connection to a heat exchanger unit of a sectioned heat exchanger, the separating element comprising first openings adapted to align with first heat exchanger openings forming inlets of a first flow path and a second flow path, respectively, through the heat exchanger unit, the separating element further comprising second openings adapted to align with second heat exchanger openings forming outlets of the first flow path and the second flow path, respectively, through the heat exchanger unit, where the first openings are formed with first valves adapted to close for fluid flow to the first and/or the second flow path through the heat exchanger unit, and where the second openings are formed with second valves adapted to close for fluid flow from the first and/or second flow path, wherein the first valves are formed with valve stems, each operated by an actuator, and wherein the second valves are connected to the same valve stems as the first valves, thereby providing coordinated control of the first valves and the second valves.

Thus, according to the first aspect, the invention provides a separating element. The separating element is adapted to be positioned in a sectioned heat exchanger in connection to a heat exchanger unit of the sectioned heat exchanger. In the present context, the term 'sectioned heat exchanger' should be interpreted to mean a heat exchanger which comprises at least two sections or heat exchanger units, where the sections or heat exchanger units may be activated or deactivated independently of each other in order to adjust the total heat transfer capacity of the heat exchanger. Thus, the separating element according to the first aspect of the invention is adapted to be positioned in connection to one such heat exchanger unit, possibly between two heat exchanger units, thereby separating the heat exchanger units from each other.

The separating element comprises first openings adapted to align with first heat exchanger openings forming inlets of a first flow path and a second flow path, respectively, through the heat exchanger unit. Thus, when the separating element is arranged in connection with a heat exchanger unit, one of the first openings of the separating element is arranged in alignment with a heat exchanger opening which forms an inlet of a first flow path through the heat exchanger unit. Accordingly, fluid may flow from this first opening to the corresponding heat exchanger opening, and into the first flow path and pass through the heat exchanger unit via the first flow path. Similarly, another one of the first openings of the separating element is arranged in alignment with a heat exchanger opening which forms an inlet of a second flow path through the heat exchanger unit, thereby allowing fluid to pass from this first opening and into the second flow path through the heat exchanger unit. Accordingly, the separating element may allow a fluid flow to each of the first and second flow paths through the heat exchanger unit, via the respective first openings. The fluids flowing in the first flow path and the second flow path, respectively, may be the two heat exchanging fluids flowing through the sectioned heat exchanger.

Furthermore, the separating element comprises second openings adapted to align with second heat exchanger openings forming outlets of the first flow path and the second flow path, respectively, through the heat exchanger unit. Accordingly, when the separating element is positioned in connection to a heat exchanger unit, the second openings of the separating element may receive fluid from the respective first and second flow paths through the heat exchanger unit, in a similar manner to how fluid is supplied to these flow paths via the first openings of the separating element, and as described above.

The first openings of the separating element are formed with first valves being adapted to close for fluid flow to the first flow path and/or to the second flow path through the heat exchanger unit. Thus, when a valve of a first opening which is aligned with a first heat exchanger opening which forms an inlet of the first flow path through the heat exchanger unit is closed, fluid is not allowed to enter the first flow path, and thereby this heat exchanger unit will be deactivated, at least with regard to the fluid which is supposed to flow through the first flow path. On the other hand, when this valve is open, fluid is allowed to flow into the first flow path through the heat exchanger unit, and the heat exchanger unit is therefore activated. The same applies to the valve of the first opening which is aligned with a first heat exchanger opening which forms an inlet of the second flow path through the heat exchanger unit.

Similarly, the second openings of the separating element are formed with second valves being adapted to close for fluid flow from the first and/or from the second flow path through the heat exchanger unit. Accordingly, fluid flow out of the first and second flow paths, respectively, can be allowed or prevented by appropriately operating the second valves, similarly to the situation described above with reference to the first valves and the inlets of the flow paths.

The first valves are formed with valve stems which are each operated by an actuator. The second valves are connected to the same valve stems as the first valves. Accordingly, each valve stem has one first valve and one second valve connected thereto. This allows for coordinated control of the first valve and the second valve being connected to the same valve stem, by appropriately operating the actuator. This coordinated control of the valves at the fluid inlets and the valves at the fluid outlets allows a heat exchanger unit of the sectioned heat exchanger to be activated and deactivated in an easy, accurate and reliable manner. This, in turn, allows the heat transfer capacity of the heat exchanger to be scaled in an easy, accurate and reliable manner. Accordingly, energy loss due to inappropriate dimensioning of the heat exchanger is avoided.

The first valves and the second valves may be arranged such that when a first valve is open the corresponding second valve is open, and when a first valve is closed the corresponding second valve is closed. According to this embodiment, the inlet and the outlet of a given flow path through the heat exchanger unit are opened and closed simultaneously when the first valve and the second valve are operated in a coordinated manner by means of the common valve stem. This ensures that the heat exchanger unit can efficiently activated and deactivated in an easy and accurate manner.

As an alternative, the first valves and the second valves may be arranged such that when a first valve is open the corresponding second valve is closed, and when a first valve is closed the corresponding second valve is open. According to this embodiment, the coordinated control of the first valve and the second valve connected to a common valve stem causes an outlet of a given flow path through the heat exchanger unit to be closed when the inlet to that flow path is opened, and vice versa. This may allow a fluid flow to pass a deactivated heat exchanger unit. It may further allow for a flow through one of the flow paths through one of the heat exchanger units to be reversed.

According to a second aspect, the invention provides a sectioned heat exchanger comprising at least two heat exchanger units and at least one separating element according to the first aspect of the invention, wherein each separating element is arranged between two of the heat exchanger units, thereby separating the two heat exchanger units.

Thus, according to the second aspect, the invention provides a sectioned heat exchanger, i.e. a heat exchanger with at least two heat exchanger units, as described above with reference to the first aspect of the invention. The sectioned heat exchanger further comprises at least one separating element according to the first aspect of the invention, i.e. a separating element as described above. Each separating element is arranged between two of the heat exchanger units, and thereby each separating element separates the two heat exchanger units it is arranged between. Thereby, when the valves of the separating element are operated in a coordinated manner, as described above, one or both of the heat exchanger elements being arranged adjacent to the separating element can be activated or deactivated. Accordingly, the capacity of the heat exchanger can be adjusted in an easy, accurate and reliable manner.

The at least one separating element may be adapted to activate a fluid flow between first heat exchanger openings and second heat exchanger openings of at least one of the heat exchanger units by coordinated control of the first valves and the second valves, thereby activating a flow in the first flow path or in the second flow path through at least one of the heat exchanger units. As described above, the relevant heat exchanger unit is thereby activated or deactivated, and accordingly the total capacity of the sectioned heat exchanger is adjusted.

The at least one separating element may be adapted to activate a fluid flow between a first heat exchanger unit and a second heat exchanger unit by coordinated control of the first valves and the second valves. According to this embodiment, the first heat exchanger unit and the second heat exchanger unit are fluidly connected to each other, thereby forming a single, large heat exchanger unit. This is obtained simply by appropriately operating the valves of the separating element.

According to a third aspect, the invention provides a method for operating a sectioned heat exchanger according to the second aspect of the invention, the method comprising the steps of:

selecting at least one heat exchanger unit to be activated, selecting at least one separating element positioned in connection to the at least one selected heat exchanger unit, and performing coordinated control of the first valves and the second valves of the at least one selected separating element in order to allow fluid flow in the first flow path and/or in the second flow path through the at least one selected heat exchanger unit, thereby activating the at least one selected heat exchanger unit.

Thus, the method according to the third aspect of the invention is a method for operating a sectioned heat exchanger according to the second aspect of the invention, and thereby a sectioned heat exchanger comprising at least one separating element according to the first aspect of the invention. Accordingly, the remarks set forth above with reference to the first and second aspects of the invention are therefore equally applicable here.

In the method according to the third aspect of the invention, at least one heat exchanger unit to be activated is initially selected. For instance, at least one heat exchanger unit may need to be activated because an increase in the total capacity of the sectioned heat exchanger is required. This may, e.g., be due to a change in operating conditions and/or a change in cooling or heating requirements.

Next, at least one separating element positioned in connection to the at least one selected heat exchanger unit is selected. Accordingly, the selected at least one separating element is positioned relative to the selected heat exchanger unit in such a manner that the valves of the separating element can be operated to allow or prevent a fluid flow through the first and/or second flow path through the selected heat exchanger unit.

Therefore, coordinated control of the first valves and the second valves of the at least one selected separating element is then performed, in order to allow fluid flow in the first flow path and/or in the second flow path through the at least one selected heat exchanger unit. Thereby the at least one selected heat exchanger unit is activated, and the total capacity of the sectioned heat exchanger is increased as desired.

The method may further comprise the steps of:

selecting at least one further heat exchanger unit to be activated, selecting at least one separating element positioned in connection to the at least one selected further heat exchanger unit, and performing coordinated control of the first valves and the second valves of the at least one selected separating element in order to allow fluid flow in the first flow path and/or in the second flow path through the at least one selected further heat exchanger unit, thereby activating the at least one selected further heat exchanger unit.

According to this embodiment, the process described above is repeated, in such a manner that yet another heat exchanger unit is activated, thereby increasing the total capacity of the sectioned heat exchanger even further.

The step of selecting at least one heat exchanger unit to be activated may be based on a requirement for heat transfer from the sectioned heat exchanger. According to this embodiment, the sectioned heat exchanger is dimensioned in accordance with the current requirements of cooling or heating to be provided by the heat exchanger. Thus, it is ensured that the heat exchanger operates efficiently and without unnecessary loss of energy at all times, even if the requirements for heat transfer from the heat exchanger varies.

The step of selecting at least one heat exchanger unit to be activated may be based on a measurement of a pressure or differential pressure in the sectioned heat exchanger, on a measurement of a flow rate in the sectioned heat exchanger, and/or on a measurement of a temperature of fluid flowing in the sectioned heat exchanger. Changes in pressure, flow rate and/or temperature of the fluid flowing the sectioned heat exchanger may indicate fouling or scaling in the heat exchanger, and thereby a requirement for increasing the capacity of the sectioned heat exchanger.

DETAILED DESCRIPTION

The detailed description and specific examples, while indicating embodiments of the invention, are given by way of illustration only.

Figure 1:
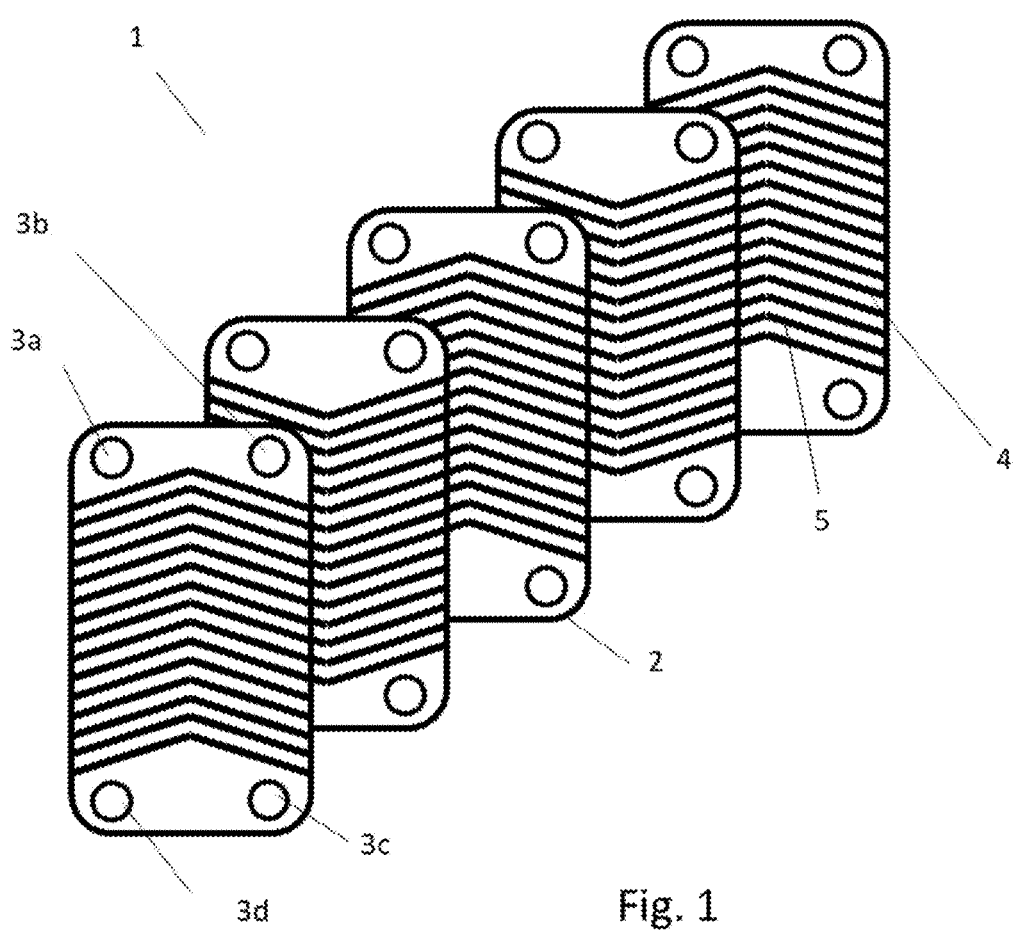
FIG. 1 is a basic illustration of a plate kind heat exchanger.

FIG. 1 illustrates a heat exchanger 1 formed of heat transfer plates 2 connected to each other to form a stack of heat transfer plates 2. Each heat transfer plate 2 is formed with openings 3a, 3b, 3c, 3d and a heat exchanging portion 4 with surface patterns 5. When stacked, the connected surface patterns 5 of neighbouring plates 2 form flow paths A, B at the respective opposite plate 2 surfaces. Further, the openings 3a, 3b, 3c, 3d are aligned forming respectively a first set of openings 3a, 3d, defining an inlet 3a and an outlet 3d, respectively, to a first flow path A, and a second set of openings 3b, 3c, defining an inlet 3b and an outlet 3c to a second flow path B. The first set of openings 3a, 3d and the first flow path A are sealed from the second set of openings 3b, 3c and the second flow path B, thereby allowing two separate fluids to pass the heat exchanger without the two fluids contacting and mixing.

The inlets 3a, 3b and outlets 3d, 3c for each of the respectively first flow path A and second flow path B reach through the heat exchanger 1 and are adapted to connect to respectively a primary side flow system and a secondary side flow system, e.g. the primary side being a distribution of heating fluid from a heating plant, like solar energy, geothermal energy or district energy, and the secondary side being water being supplied to a consumer, such as to radiators, floor heating, water taps, etc. Correspondingly, the first flow path A is also referred to as the primary side of the heat exchanger 1, and the flow therethrough as the primary side flow and fluid. Similarly, the second flow path B is referred to as the secondary side of the heat exchanger 1, and the flow therethrough as the secondary side flow and fluid.

The heat exchanger 1 is adapted for heat to be transferred from the hotter to the colder of the primary side and secondary side fluids over the heat transfer plates 2.

Such heat exchangers 1 exist in different versions, where some have the heat transfer plates 2 brazed or welded together at the contact areas of the connected surface patterns 5 and along their contacting edges, and at the sealed off openings 3a, 3b, 3c, 3d. Gasketed versions introduce gaskets to seal between the plates 2 along the edges and at the openings 3a, 3b, 3c, 3d, where the plates 2 and gaskets then are held tightly together by a tension, possible using thicker end plates at the upper and lower ends of the stacks being compressed towards each other by bolts.

The present invention could include either version, or even a combination of gasket, brazed and/or welded heat exchangers 1.

In heating and/or cooling systems the requirement of heating or cooling may change over time, just as the efficiency of the heat exchanger(s) 1 in the heating and/or cooling systems may change due to, e.g., fouling.

For example, when a heat exchanger 1 is over-dimensioned in relation to the required heat transfer, the flows may need to be so low, in order to match a requested temperature, that the heat exchanger 1 operates inefficiently with unnecessary loss of energy.

If the heat exchanger 1 scales or fouls, its heat transfer characteristics change, and the flows therefore may need to be increased to meet the requirements, again with an unnecessary loss of energy.

Figure 2:
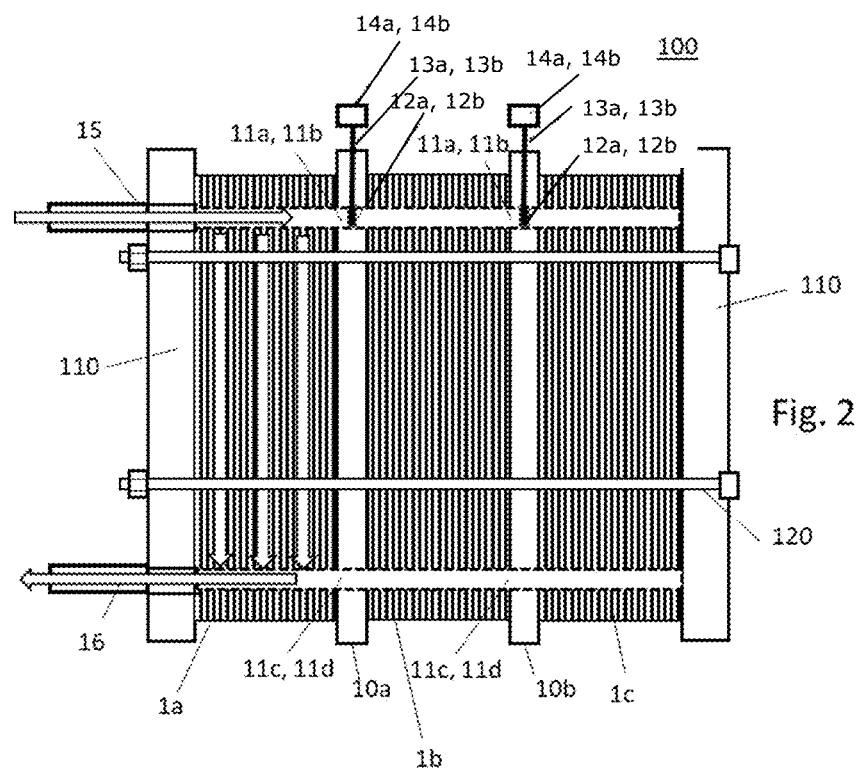
FIG. 2 is a basic illustration of a sectioned heat exchanger according to an embodiment of the present invention with first valves controlling the inlets to the sections, where only the first section is active, and with the main inlet and outlet connections positioned at the same side.

To solve such problems, the present invention introduces a method and means to make a scalable heat exchanger 1, where a basic embodiment is illustrated in FIG. 2.

FIG. 2 shows a sectioned heat exchanger 100 with three individual heat exchangers 1a, 1b, 1c, also referred to as heat exchanger units 1a, 1b, 1c, positioned in succession, and separated by separating elements 10a, 10b. In the illustrated embodiment, the separating elements 10a, 10b are formed of plate elements of a significantly larger thickness than the individual heat transfer plates 2. The separating elements 10a, 10b are formed with openings 11a, 11b, 11c, 11d adapted to align with respective inlets 15 and outlets 16 formed by the openings 3a, 3b, 3c, 3d of the heat transfer plates 2 of the heat exchanger units 1a, 1b, 1c.

The arrangement of heat exchanger units 1a, 1b, 1c is defined such that the first heat exchanger unit 1a is the first seen in the flow direction from inlet connection 15 to the main outlet connection 16 of the sectioned heat exchanger 100 to the heating or cooling system, the second heat exchanger unit 1b thus follows the first heat exchanger unit 1a, etc.

The arrangement of heat exchanger units 1a, 1b, 1c with separating elements 10a, 10b in-between is such that the openings 11a, 11b, 11c, 11d connect to openings 3a, 3b, 3c, 3d of both the neighbouring heat exchangers units 1a, 1b, 1c, whereto it connects, except for the two at the ends connecting only to one heat exchanger unit 1a, 1b, 1c.

The openings 11a, 11b associated with inlets are each formed with a first valve 12a, 12b adapted to open and close the respective openings 11a, 11b. They may be formed with a valve stem 13a, 13b and actuator 14a, 14b, where the actuators 14a, 14b could be manually operated or electrical, possible remotely controlled, e.g. by wired or wireless communication.

In FIG. 2, the first valves 12a, 12b of the first separating element 10a in front of the second heat exchanger unit 1b, are closed. The first separating element 10a is positioned between the first heat exchanger unit 1a and the second heat exchanger unit 1b. The fluid flow therefore cannot enter the second heat exchanger unit 1b, but is limited to the first heat exchanger unit 1a only.

The openings 11c, 11d associated with the outlets in the illustrated embodiment are always open, allowing return flow to the main outlet connection 16. Backflow into the subsequent heat exchanger units 1b, 1c is prevented due to the pressure differences between the inlet openings 3a, 3b and the outlet openings 3c, 3d. This ensures that only the first heat exchanger unit 1a will be active with no fluid flow in the second heat exchanger unit 1b and the third heat exchanger unit 1c.

In the illustrated embodiment, the main inlet 15 and outlet 16 connections are positioned at the same side, but they could just as well be positioned at the opposite side of the sectioned heat exchanger 100, i.e. at separate endplates 110.

If a higher heat transferring capacity is required, the second heat exchanger unit 1b could be opened or activated by opening the first valves 12a, 12b in the first separating element 10a. This will open a fluid connection between openings 11a, 11b in the first separating element 10a and the respective first (inlet) openings 3a, 3b of the second heat exchanger unit 1b, see FIG. 3. Fluid flow (primary and secondary) now passes the first heat exchanger unit 1a as well as the second heat exchanger unit 1b.

The first valves 12a, 12b of the second separating element 10b positioned between the second heat exchanger unit 1b and the third heat exchanger unit 1c are still closed, thus shutting off the flow to the third heat exchanger unit 1c. If even more heat transferring capacity is required, the first valves 12a, 12b of the second separating element 10b can be opened, thereby activating the third heat exchanger unit 1c and reaching maximum heat transfer capacity of the sectioned heat exchanger 100.

Since the heat exchanger units 1a, 1b, 1c each comprises a first flow path A and a second flow path B for respectively the first and second fluids, each of the inlet first valves 12a, 12b is usually opened, allowing flow of both fluids through the respective heat exchanger unit 1a, 1b, 1c.

Backflow into the subsequent heat exchanger unit 1c is again prevented, due to the pressure differences between the inlet openings 3a, 3b and the outlet openings 3c, 3d. This ensures that only the first heat exchanger unit 1a and the second heat exchanger unit 1b will be active, with no fluid flow in the third heat exchanger unit 1c.

Figure 3:
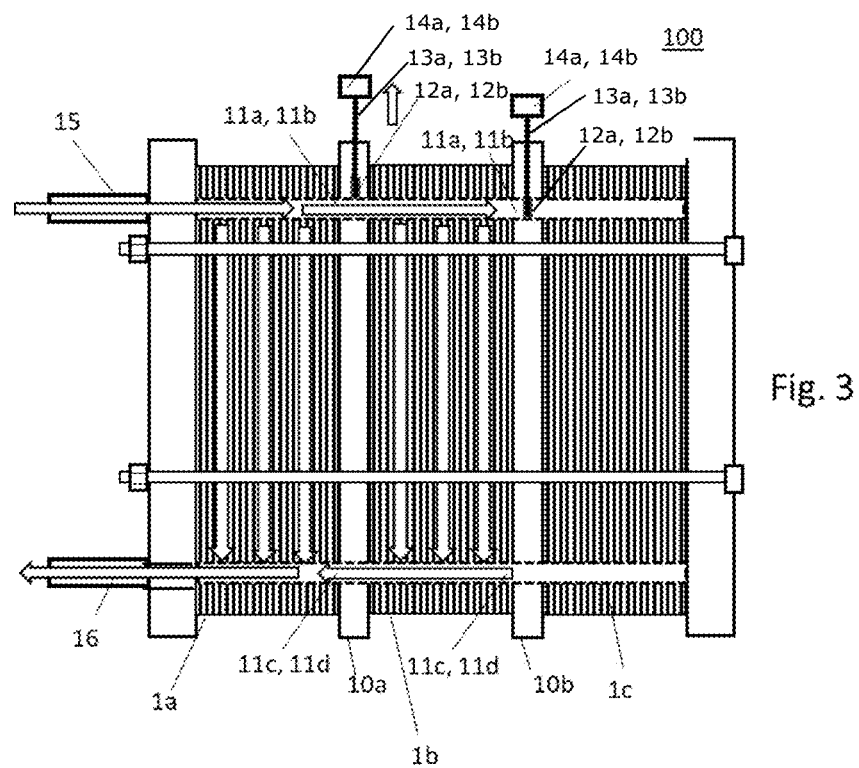
FIG. 3 is a basic illustration of a sectioned heat exchanger according to an embodiment of the present invention with first valves controlling the inlets to the sections, where the two first sections are active, and with the main inlet and outlet connections positioned at the same side.
Figure 4:
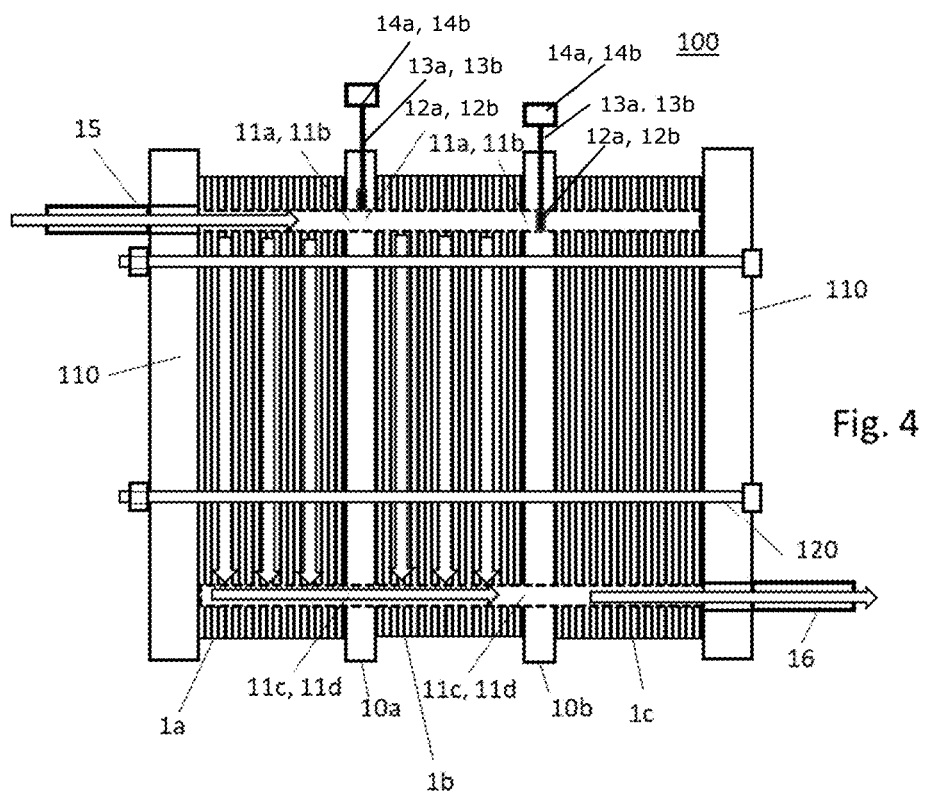
FIG. 4 is a basic illustration of a sectioned heat exchanger according to an embodiment of the present invention with first valves controlling the inlets to the sections, where the two first sections are active, and with the main inlet and outlet connections positioned at opposite sides.

FIG. 4 shows the same situation as illustrated in FIG. 3, with the two first heat exchanger units 1a, 1b active, but where the main outlet connection 16 is positioned at the opposite side, relative to the main inlet connection 15, i.e. at the other endplate 110.

Figure 5:
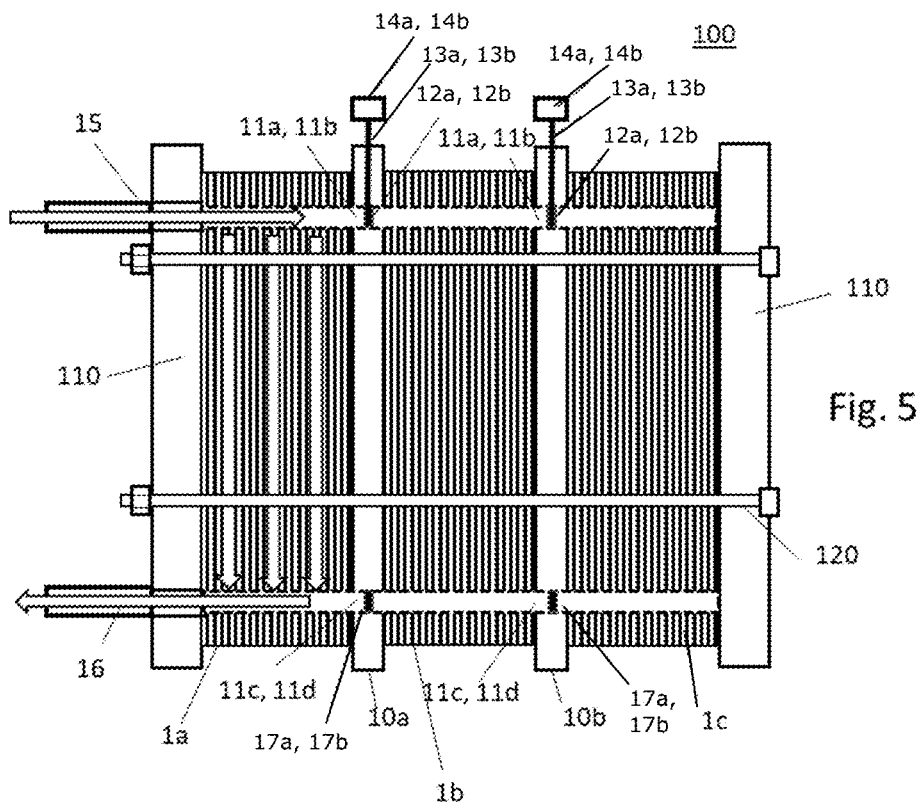
FIG. 5 is a basic illustration of a sectioned heat exchanger according to an embodiment of the present invention with first valves controlling the inlets to the sections and second valves controlling the outlets being directional valves, where the first section is active, and with the main inlet and outlet connections positioned at the same side.

FIG. 5 shows the same embodiment as FIG. 2, only where second valves 17a, 17b are positioned in the openings 11c, 11d associated with the outlets 3c, 3d formed in the heat transfer plates 2 of the heat exchanger units 1a, 1b, 1c to prevent flow to the subsequent heat exchanger units 1b, 1c, where the second valves 17a, 17b are directional valves, such as check valves. This ensures that only the first heat exchanger unit 1a will be active with no fluid flow in the second heat exchanger unit 1b and the third heat exchanger unit 1c. This embodiment could be implemented, e.g. if the backflow into the subsequent heat exchanger units 1b, 1c for some reason cannot be prevented by the pressure differences between the and inlet openings 3a, 3b and the outlet openings 3c, 3d.

If the main outlet connection 16 is positioned oppositely, the second valves 17a, 17b would be connected to allow fluid in the opposite direction.

Figure 6:
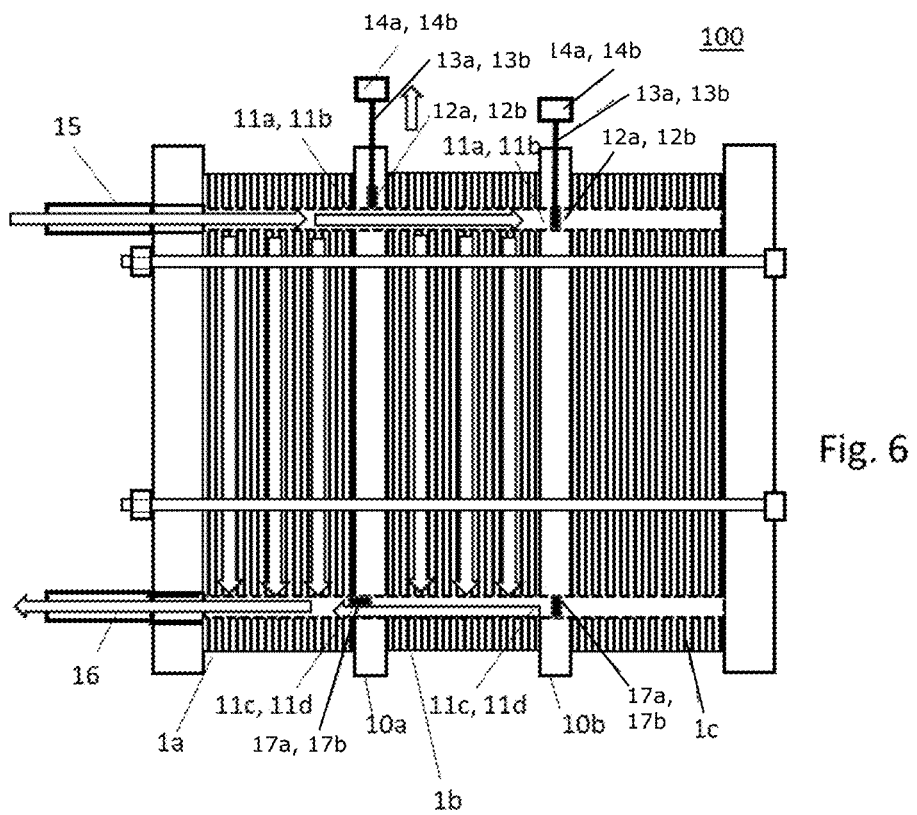
FIG. 6 is a basic illustration of a sectioned heat exchanger according to an embodiment of the present invention with first valves controlling the inlets to the sections and second valves controlling the outlets being directional valves, where the first two sections are active, and with the main inlet and outlet connections positioned at the same side.

FIG. 6 shows the same embodiment as FIG. 5, only where the second heat exchanger unit 1b is activated by opening the first valves 12a, 12b in the first openings 11a, 11b of the first separating element 10a, connected to the respective first openings 3a, 3b formed in the heat transfer plates 2 of the second heat exchanger unit 1b, here operating as inlets. Fluid flow (primary and secondary) now passes both the first heat exchanger unit 1a and the second heat exchanger unit 1b. The second valves 17a, 17b of the first separating element 10a are now open due to the return flow in the second heat exchanger unit 1b.

The first valves 12a, 12b and the second valves 17a, 17b of the second separating element 10b positioned between the second heat exchanger unit 1b and the third heat exchanger unit are still closed, thus shutting off the flow to the third heat exchanger unit 1c. If even more heat transferring capacity is required, the first valves 12a, 12b of the second separating element 10b can be opened, thereby activating the third heat exchanger unit 1c.

Figure 7:
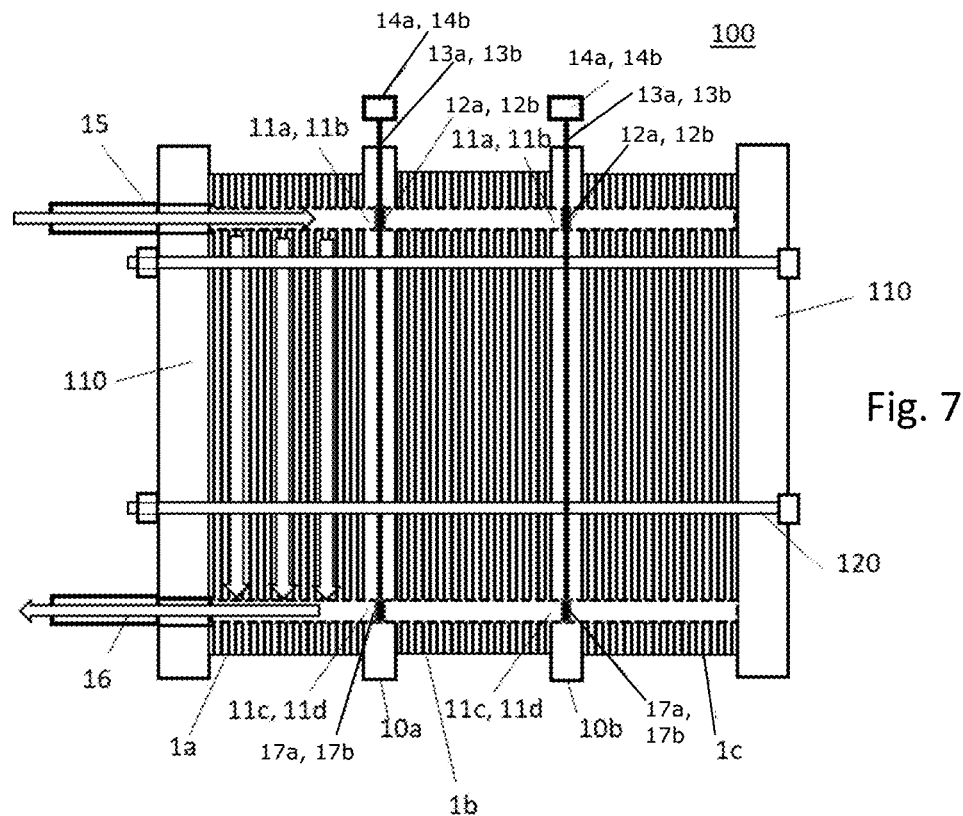
FIG. 7 is a basic illustration of a sectioned heat exchanger according to an embodiment of the present invention with first valves controlling the inlets to the sections and second valves controlling the outlets are connected to the same valve stem as the first valves, where the first section is active, and with the main inlet and outlet connections positioned at the same side.
Figure 8:
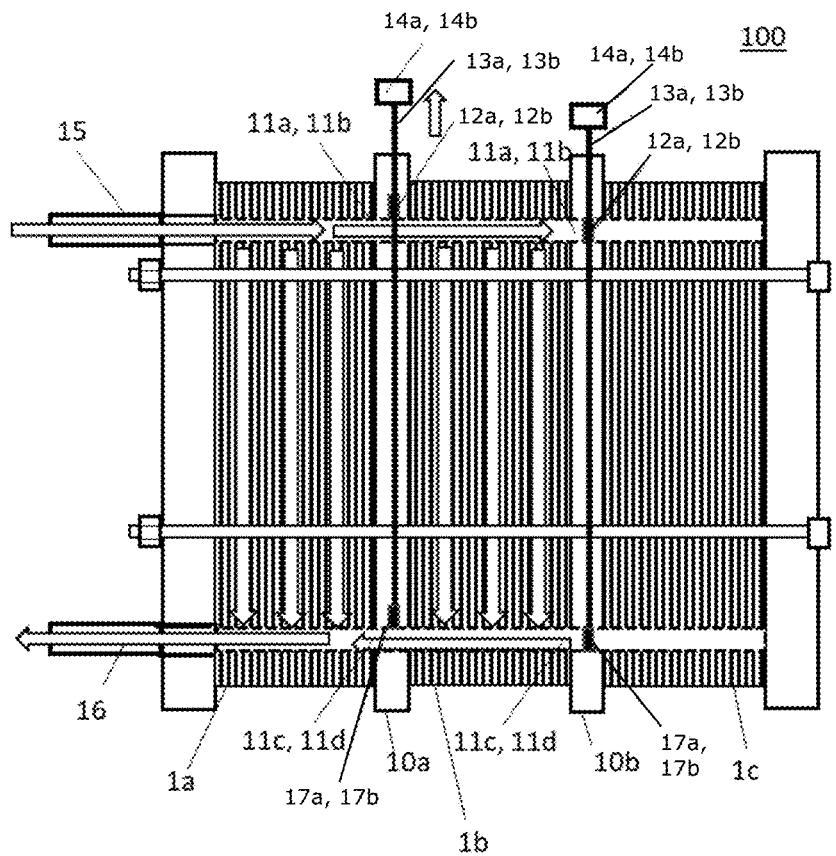
FIG. 8 is a basic illustration of a sectioned heat exchanger according to an embodiment of the present invention with first valves controlling the inlets to the sections and second valves controlling the outlets are connected to the same valve stem as the first valves, where the first two section are active, and where the first valves and second valves open and close at the same time, and with the main inlet and outlet connections positioned at the same side.

FIGS. 7 and 8 show basically the same embodiment as FIG. 6, only where the first valves 12a, 12b and the second valves 17a, 17b are connected to the same valve stem 13a, 13b and thus activated simultaneously by the same actuator 14a, 14b. In the illustrated embodiment, the first valves 12a, 12b and the second valves 17a, 17b are closed and opened simultaneously, i.e. when a first valve 12a, 12b is opened or closed the connected second valve 17a, 17b is opened or closed correspondingly.

In FIG. 7, the first valves 12a, 12b and the second valves 17a, 17b of the first separating element 10a, as well as of the second separating element 10b are closed. Accordingly, only the first heat exchanger unit 1a is active, and fluid flow is prevented through the second heat exchanger unit 1b as well as through the third heat exchanger unit 1c. In FIG. 8, the first valves 12a, 12b and the second valves 17a, 17b of the first separating element 10a have been opened, while the first valves 12a, 12b and the second valves 17a, 17b of the second separating element 10b remain closed. Accordingly, the first heat exchanger unit 1a and the second heat exchanger unit 1b are active, while fluid flow is prevented through the third heat exchanger unit 1c.

Figure 9:
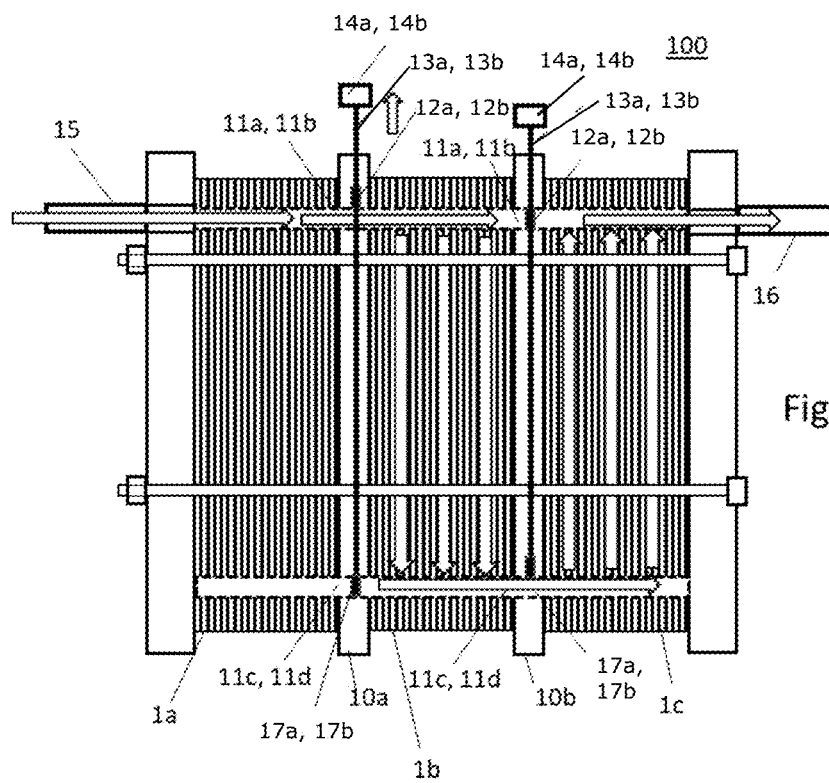
FIG. 9 is a basic illustration of a sectioned heat exchanger according to an embodiment of the present invention with first valves controlling the inlets to the sections and second valves controlling the outlets are connected to the same valve stem as the first valves, where the first two section are active, and where the first valves and second valves open and close opposite each other, and with the main inlet and outlet connections positioned at the opposite side.

FIG. 9 differs from FIG. 8 in that the first valves 12a, 12b and second valves 17a, 17b of the separating elements 10a, 10b are closed and opened non-simultaneously, i.e. when a first valve 12a, 12b is opened, the connected second valve 17a, 17b is closed, and when a first valve 12a, 12b is closed, the connected second valve 17a, 17b is opened.

In the illustration, the first heat exchanger unit 1a is inactive, due to the closed second valves 17a, 17b of the first separating element 10a positioned between the first heat exchanger unit 1a and the second heat exchanger unit 1b, whereas the first valves 12a, 12b of the first separating element 10a are open, allowing fluid to pass along the first openings 3a, 3b to the second heat exchanger unit 1b. Since the second valves 17a, 17b of the first separating element 10a are closed, there is no backflow into the first heat exchanger unit 1a, due to the pressure differences between the and inlet openings 3a, 3b and the outlet openings 3c, 3d.

The first valves 12a, 12b of the second separating element 10b, positioned between the second heat exchanger unit 1b and the third heat exchanger unit 1c are closed, whereas the second valves 17a, 17b of the second separating element 10b are open, allowing fluid to enter from the second openings 3c, 3d flowing to the first openings 3a, 3b, the third heat exchanger unit 1c thus being activated by the opening of the second valves 17a, 17 of the second separating element 10b. In this illustration, the direction of flow in the third heat exchanger unit 1c, thus, is reversed compared to the direction of flow in the second heat exchanger unit 1b, and the function of the respective openings 3a, 3b, 3c, 3d has changed function. Where the first openings 3a, 3b are inlets and second openings 3c, 3d are outlets for the second heat exchanger unit 1b, for the third heat exchanger unit 1c, the second openings 3c, 3d are inlets, and the first openings 3a, 3b are outlets.

The direction of flow and the function of the openings 3a, 3b, 3c, 3d and activation and deactivation of the individual heat exchanger units 1a, 1b, 1c, thus, depend on the settings of the individual first valves 12a, 12b and second valves 17a, 17b.

In the illustration, the main outlet 16 is positioned at the opposite endplate 110, relative to the main inlet 15.

Figure 10:
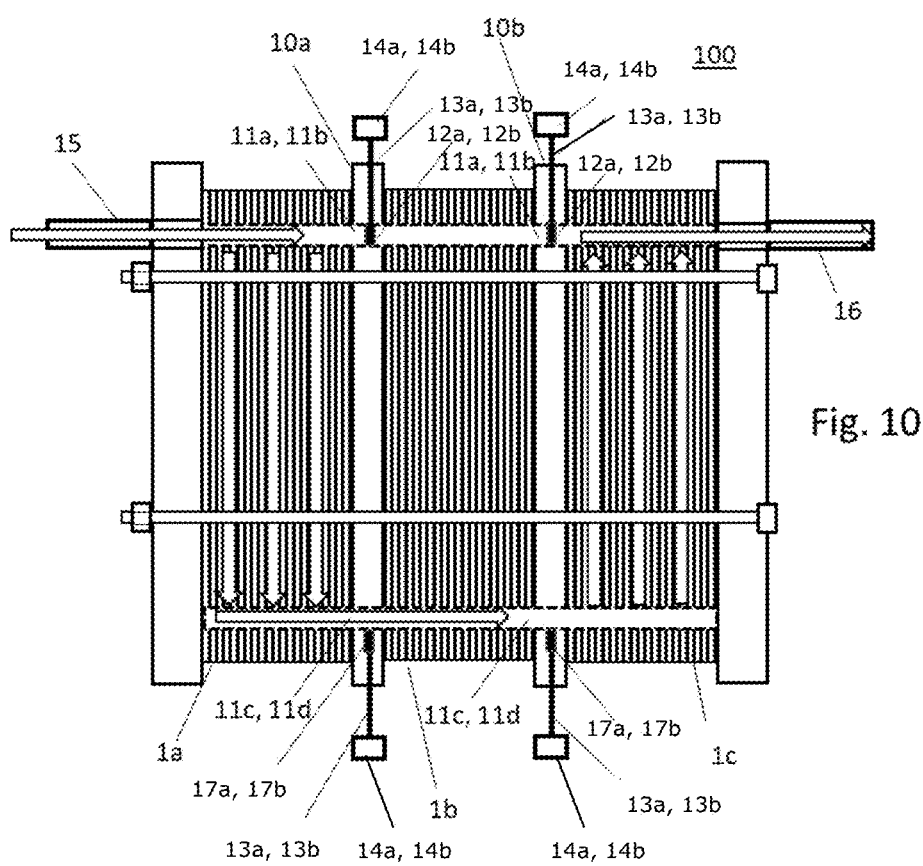
FIG. 10 is a basic illustration of a sectioned heat exchanger according to an embodiment of the present invention with first valves controlling the inlets to the sections and second valves controlling the outlets individually controllable, where the first section is active, and with the main inlet and outlet connections positioned at opposite sides.
Figures 11A, 11B:
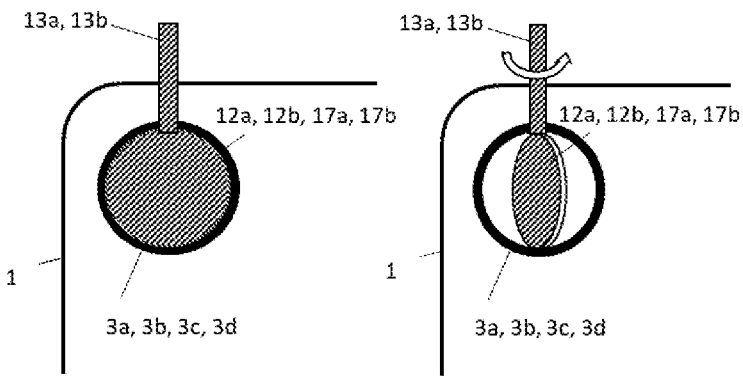
FIGS. 11A and 11B are illustrations of a butterfly valve embodiment of the first openings in respectively closed and open positions.
Figures 12A, 12B:
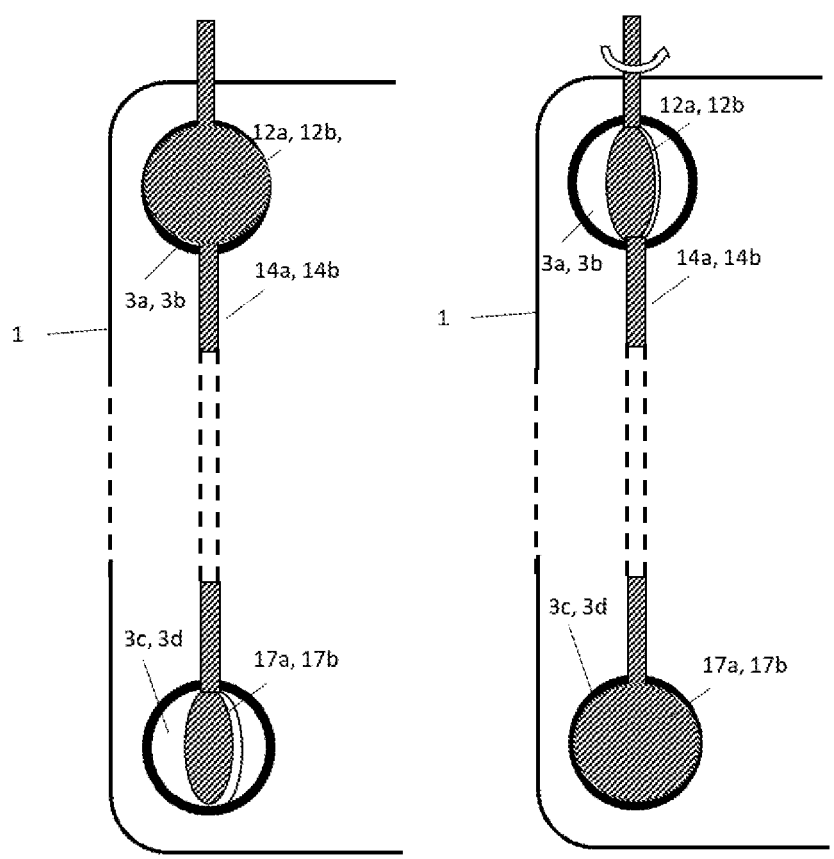
FIGS. 12A and 12B are illustrations of a butterfly valve embodiment where the first valves are connected to the second valves by the same valve stem, but where the first valve and the second valve open and close opposite each other.

FIG. 10 illustrates an embodiment very similar to the embodiment of FIG. 9, but where the first valves 12a, 12b and the second valves 17a, 17b are each attached to an actuator 14a, 14b by a valve stem 13a, 13b, and they are individually operational, i.e. each can be independently opened and closed.

In the illustration, the first heat exchanger unit 1a is active, due to the open second valves 17a, 17b of the first separating element 10a positioned between the first heat exchanger unit 1a and the second heat exchanger unit 1b, whereas the first valves 12a, 12b of the first separating element 10a are closed, deactivating the second heat exchanger unit 1b.

The second valves 17a, 17b of the second separating element 10b, positioned between the second heat exchanger unit 1b and the third heat exchanger unit 1c are open, whereas the first valves 12a, 12b of the second separating element 10b are closed, activating the third heat exchanger unit 1c, but deactivating the second heat exchanger unit 1b. Again, due to the closed first valves 12a, 12b, backflow is prevented to the second heat exchanger unit 1b, due to the pressure differences between its first openings 3a, 3b and second openings 3c, 3d, ensuring its deactivation and preventing fluid from entering.

Fluid is then allowed to pass along the second openings 3c, 3d to the third heat exchanger unit 1c.

In this illustration too, the direction of flow in the third heat exchanger unit 1c, thus, is reversed compared to the direction of flow in the first heat exchanger unit 1a, and the function of the respective openings 3a, 3b, 3c, 3d has changed function. Where the first openings 3a, 3b are inlets and second openings 3c, 3d are outlets for the first heat exchanger unit 1a, for the third heat exchanger unit 1c, the second openings 3c, 3d are inlets, and the first openings 3a, 3b are outlets.

Again, the direction of flow and the function of the openings 3a, 3b, 3c, 3d and activation and deactivation of the individual heat exchanger units 1a, 1b, 1c, thus, depend on the settings of the individual first valves 12a, 12b and second valves 17a, 17b.

In relation to any of the embodiments, the endplates 110 could each be formed with main inlet 15 and outlet 16, such that the openings 3a, 3b, 3c, 3d of neighbouring heat exchanger units 1, 1a, 1b, 1c are each connected to a main inlet 15 or outlet 16. The main inlets 15 and outlets 16, thus, could be formed with valves opening or closing them according to the actual requirement.

Further, for any of the embodiments, a sensor, such as a pressure sensor, could be included for registering if the pressure changes, this indicating possible fouling. Alternatively, for example flow sensors and/or temperature sensors could be used, and a possible fouling could be indicated by changes in the measured flow rates and/or temperatures.

This gives a method to operate a sectioned heat exchanger 100 of any embodiment, where the operating efficiency of the heat exchanger 100 is estimated by measuring the pressure of one or both fluids in respectively the first flow path A and/or the second flow path B.

The scalable heat exchanger 100 at some period may operate with, e.g., N active heat exchanger units 1a, 1b, 1c, the others being inactive (the corresponding first valves 12a, 12 band possibly second valves 17a, 17b being closed).

When a heat exchanger 1, 100 fouls or scales, the cross-sectional areas of the flow paths A, B are affected, changing the flow restriction. When the flow restriction changes, the other working conditions are affected, such as the required pressure (difference) to obtain a given flow rate is increased. Measuring the pressure, e.g. at an inlet or outlet, or the difference over the inlet and outlet, thus gives an indication of a change of the operation of the heat exchanger 1, 100 or heat exchanger unit 1a, 1b, 1c. The change can be tracked over time, and possibly averaged to remove influences of short-term fluctuations, to give an indication of the actual state of the heat exchanger 1, 100 or heat exchanger unit 1a, 1b, 1c, possibly comparing the measurements to expectations according to the characteristics of the heat exchanger 1, 100 or heat exchanger unit 1a, 1b, 1c.

If a thermostat is controlling the primary and/or secondary side flow rate according to a setpoint temperature, the flow rate is adjusted until the setpoint temperature is reached. In an alternative or additional embodiment, the flow rate therefore could be tracked and used in the same manner as the embodiment of measuring the pressure.

The change of flow rate can be tracked over time, and possibly averaged to remove influences of short-term fluctuations, to give an indication of the actual state of the heat exchanger 1, 100 or heat exchanger unit 1a, 1b, 1c, possibly comparing the measurements to expectations according to the characteristics of the heat exchanger 1, 100 or heat exchanger unit 1a, 1b, 1c.

If, for example, the flow rate and pressure are not known, an alternative could be to measure the temperatures, such as knowing some or all of the primary side inlet and outlet temperatures and secondary side inlet and outlet temperatures. The heat transferring efficiency, thus, could be estimated and be tracked over time, and possibly averaged to remove influences of short-term fluctuations, to give an indication of the actual state of the heat exchanger 1, 100 or heat exchanger unit 1a, 1b, 1c, possibly comparing the measurements to expectations according to the characteristics of the heat exchanger 1, 100 or heat exchanger unit 1a, 1b, 1c.

In either of the embodiments, at some time, if a defined threshold is crossed (pressure, pressure difference, flow rate, one or more temperatures or heat transferring efficiency), an additional heat exchanger unit 1a, 1b, 1c of the sectioned heat exchanger 100 is added by opening the respective first valve 12a, 12b (possibly the respective second valves 17a, 17b too). The sectioned heat exchanger 100 now operates with N+1 active heat exchanger units 1a, 1b, 1c until the defined threshold is crossed again, leading to activating a further heat exchanger unit 1a, 1b, 1c, etc.

Correspondingly, a crossing back over the defined threshold, could trigger that one or more heat exchanger units 1a, 1b, 1c could be deactivated.

In another embodiment, other parameters are used to define if an additional heat exchanger unit 1a, 1b, 1c should be activated—or deactivated. This could, e.g., be knowing the season, e.g. using a higher number of activated heat exchanger units 1a, 1b, 1c during winter than during summer. Alternatively or additionally, the number of activated heat exchanger units 1a, 1b, 1c could be linked to a consumer requested temperature, etc.

In one embodiment, relevant to any of the previous embodiments described herein, the different heat exchanger units 1a, 1b, 1c may have different characteristics, and the selected activated heat exchanger unit 1a, 1b, 1c is based on which best fits the actual requirements.

It should be indicated in relation to any of the embodiments, that even though the three heat exchanger units 1a, 1b, 1c are illustrated in the embodiments, the sectioned heat exchanger 100 could comprise any number of heat exchanger units 1a, 1b, 1c with appropriate separating elements 10a, 10b in-between.

To keep the parts together in the sectioned heat exchanger 100, endplates 110 may be positioned at front and back, and being held together by bolts 120. The parts of the sectioned heat exchanger 100 could be braced or welded together or positioned in a box.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A separating element adapted to be positioned in connection to a heat exchanger unit of a sectioned heat exchanger, the separating element comprising first openings adapted to align with first heat exchanger openings forming inlets of a first flow path (A) and a second flow path (B), respectively, through the heat exchanger unit, the separating element further comprising second openings adapted to align with second heat exchanger openings forming outlets of the first flow path (A) and the second flow path (B), respectively, through the heat exchanger unit, where the first openings are formed with first valves adapted to close for fluid flow to the first (A) and/or the second (B) flow path through the heat exchanger unit and where the second openings are formed with second valves adapted to close for fluid flow from the first (A) and/or second (B) flow path, wherein the first valves are formed with valve stems, each operated by an actuator, wherein the second valves for flow path (A) are connected to the same valve stems as the first valves for flow path (A), and wherein the second valves for flow path (B) are connected to the same valve stems as the first valves for flow path (B), thereby providing coordinated control of the first valves and the second valves.

2. The separating element according to claim 1, wherein for each of the first (A) and second (B) flow paths the first valves and the second valves are arranged such that when the first valve is open the second valve is open, and when the first valve is closed the second valve is closed.

3. The separating element according to claim 1, wherein for each of the first (A) and second (B) flow paths the first valves and the second valves are arranged such that when the first valve is open the second valve is closed, and when the first valve is closed the second valve is open.

4. A sectioned heat exchanger comprising at least two heat exchanger units and at least one separating element adapted to be positioned in connection to a heat exchanger unit of a sectioned heat exchanger, the separating element comprising first openings adapted to align with first heat exchanger openings forming inlets of a first flow path (A) and a second flow path (B), respectively, through the heat exchanger unit, the separating element further comprising second openings adapted to align with second heat exchanger openings forming outlets of the first flow path (A) and the second flow path (B), respectively, through the heat exchanger unit, where the first openings are formed with first valves adapted to close for fluid flow to the first (A) and/or the second (B) flow path through the heat exchanger unit and where the second openings are formed with second valves adapted to close for fluid flow from the first (A) and/or second (B) flow path, wherein the first valves are formed with valve stems, each operated by an actuator, wherein the second valves for flow path (A) are connected to the same valve stems as the first valves for flow path (A), wherein the second valves for flow path (B) are connected to the same valve stems as the first valves for flow path (B), thereby providing coordinated control of the first valves and the second valves, and wherein each of the at least one separating element is arranged between two of the heat exchanger units, thereby separating the two heat exchanger units.

5. The sectioned heat exchanger according to claim 4, wherein the at least one separating element is configured to activate a fluid flow between first heat exchanger openings and second heat exchanger openings of at least one of the heat exchanger units by coordinated control of the first valves and the second valves, thereby activating a flow in the first flow path (A) or in the second flow path (B) through at least one of the heat exchanger units.

6. The sectioned heat exchanger according to claim 4, wherein the at least one separating element is configured to activate a fluid flow between a first heat exchanger unit of the at least two heat exchanger units and a second heat exchanger unit of the at least two heat exchanger units by coordinated control of the first valves and the second valves.

7. A method for operating the sectioned heat exchanger according to claim 4, the method comprising the steps of:
    selecting at least one heat exchanger unit to be activated;
    selecting at least one separating element positioned in connection to the at least one selected heat exchanger unit; and
    performing coordinated control of the first valves and the second valves of the at least one selected separating element in order to allow fluid flow in the first flow path (A) and/or in the second flow path (B) through the at least one selected heat exchanger unit, thereby activating the at least one selected heat exchanger unit.

8. The method according to claim 7, further comprising the steps of:
    selecting at least one further heat exchanger unit to be activated;
    selecting at least one separating element positioned in connection to the at least one selected further heat exchanger unit; and
    performing coordinated control of the first valves and the second valves of the at least one selected separating element in order to allow fluid flow in the first flow path (A) and/or in the second flow path (B) through the at least one selected further heat exchanger unit, thereby activating the at least one selected further heat exchanger unit.

9. The method according to claim 7, wherein the step of selecting at least one heat exchanger unit to be activated is based on a requirement for heat transfer from the sectioned heat exchanger.

10. The method according to claim 7, wherein the step of selecting at least one heat exchanger unit to be activated is based on a measurement of a pressure or differential pressure in the sectioned heat exchanger.

11. The method according to claim 7, wherein the step of selecting at least one heat exchanger unit to be activated is based on a measurement of a flow rate in the sectioned heat exchanger.

12. The method according to claim 7, wherein the step of selecting at least one heat exchanger unit to be activated is based on a measurement of a temperature of fluid flowing in the sectioned heat exchanger.

13. A sectioned heat exchanger comprising at least two heat exchanger units and at least one separating element according to claim 2, wherein each of the at least one separating element is arranged between two of the heat exchanger units, thereby separating the two heat exchanger units.

14. A sectioned heat exchanger comprising at least two heat exchanger units and at least one separating element according to claim 3, wherein each of the at least one separating element is arranged between two of the heat exchanger units, thereby separating the two heat exchanger units.

15. The sectioned heat exchanger according to claim 5, wherein the at least one separating element is configured to activate a fluid flow between a first heat exchanger unit of the at least two heat exchanger units and a second heat exchanger unit of the at least two heat exchanger units by coordinated control of the first valves and the second valves.

16. A method for operating the sectioned heat exchanger according to claim 5, the method comprising the steps of:
    selecting at least one heat exchanger unit to be activated;
    selecting at least one separating element positioned in connection to the at least one selected heat exchanger unit; and
    performing coordinated control of the first valves and the second valves of the at least one selected separating element in order to allow fluid flow in the first flow path (A) and/or in the second flow path (B) through the at least one selected heat exchanger unit, thereby activating the at least one selected heat exchanger unit.

17. A method for operating the sectioned heat exchanger according to claim 6, the method comprising the steps of:
    selecting at least one heat exchanger unit to be activated;
    selecting at least one separating element positioned in connection to the at least one selected heat exchanger unit; and
    performing coordinated control of the first valves and the second valves of the at least one selected separating element in order to allow fluid flow in the first flow path (A) and/or in the second flow path (B) through the at least one selected heat exchanger unit, thereby activating the at least one selected heat exchanger unit.

18. The method according to claim 8, wherein the step of selecting at least one heat exchanger unit to be activated is based on a requirement for heat transfer from the sectioned heat exchanger.

19. The method according to claim 8, wherein the step of selecting at least one heat exchanger unit to be activated is based on a measurement of a pressure or differential pressure in the sectioned heat exchanger.

20. The method according to claim 9, wherein the step of selecting at least one heat exchanger unit to be activated is based on a measurement of a pressure or differential pressure in the sectioned heat exchanger.

* * * * *